US010419797B2

United States Patent
Subramanian

(10) Patent No.: US 10,419,797 B2
(45) Date of Patent: Sep. 17, 2019

(54) SERVER INDEPENDENT CLOUD VIDEO PLAYOUT SYSTEM

(71) Applicant: M/S. Amagi Media Labs Pvt. Ltd, Bangalore (IN)

(72) Inventor: Baskar Subramanian, Bangalore (IN)

(73) Assignee: M/S. Amagi Media Labs Pvt. Ltd, Bangalore (IN)

( * ) Notice: Subject to any disclaimer, the term of this patent is extended or adjusted under 35 U.S.C. 154(b) by 0 days.

(21) Appl. No.: 15/937,202

(22) Filed: Mar. 27, 2018

(65) Prior Publication Data

US 2019/0246154 A1 Aug. 8, 2019

(51) Int. Cl.
*H04N 21/262* (2011.01)
*H04N 21/234* (2011.01)
*H04N 21/254* (2011.01)
*H04N 21/236* (2011.01)
*H04N 21/274* (2011.01)

(52) U.S. Cl.
CPC ....... *H04N 21/2625* (2013.01); *H04N 21/236* (2013.01); *H04N 21/23406* (2013.01); *H04N 21/254* (2013.01); *H04N 21/26258* (2013.01); *H04N 21/274* (2013.01)

(58) Field of Classification Search
CPC ............. H04N 21/2625; H04N 21/274; H04N 21/236; H04N 21/254; H04N 21/23406; H04N 21/26258; H04N 21/6582; H04N 21/4722; H04N 21/44222; H04N 21/44008; H04N 21/25866; H04N 21/4383; H04N 21/251; H04N 21/8405; H04N 21/2668

See application file for complete search history.

(56) References Cited

U.S. PATENT DOCUMENTS

| | | | |
|---|---|---|---|
| 2002/0004840 A1* | 1/2002 | Harumoto | H04L 47/10 709/231 |
| 2010/0218231 A1* | 8/2010 | Frink | H04N 7/17318 725/118 |
| 2013/0179916 A1* | 7/2013 | Roberts | H04N 21/2407 725/32 |

(Continued)

*Primary Examiner* — Benjamin R Bruckart
*Assistant Examiner* — Aklil M Tesfaye
(74) *Attorney, Agent, or Firm* — Laurence P. Colton; Smith Tempel Blaha LLC

(57) ABSTRACT

For broadcast-grade service level guarantees for linear video Playout, it is important for Playout systems and the associated server hardware to be extremely reliable. To accomplish this both the Playout software and server hardware are tightly integrated in on-premise implementations. Playout systems on the cloud allow for leveraging cloud servers dynamically for running Playout systems. The present invention proposes a system and method redundant, cost-effective for time-advanced, server-independent cloud Playout, which is useful in a variety of scenarios including but not limited to accomplishing seamless redundancy, optimizing operating costs by choosing different service provider/regions/servers. This is achieved by pre-playing the channel ahead of schedule, and then passing it to the output through an intelligent delay buffer. By switching Playout across multiple servers by instantiating new Playout software on another cloud server without impacting the linear output feed streamed out of the delay buffer we accomplish a server independent Playout system.

12 Claims, 10 Drawing Sheets

(56) References Cited

U.S. PATENT DOCUMENTS

2015/0146778 A1* 5/2015 De Cicco ............. H04N 19/149
                                                                  375/240.07
2017/0064342 A1* 3/2017 Botsford .......... H04N 21/23439
2017/0244991 A1* 8/2017 Aggarwal ........ H04N 21/23805

* cited by examiner

SERVER INDEPENDENT CLOUD VIDEO PLAYOUT SYSTEM

STATEMENT OF RELATED APPLICATIONS

This patent application claims priority on and the benefit of Indian Patent Application No. 201841004669 having a filing date of 7 Feb. 2018.

BACKGROUND OF THE INVENTION

Problem Statement

TV networks and content owners worldwide are exploring leveraging of cloud infrastructure to move their linear Playout capabilities. Playout software assembles video, audio, graphics, logo, subtitle, and different triggers to create a linear Playout channel. This process of Playout is currently implemented on cloud servers instead of dedicated hardware in specific locations. This provides tremendous advantages of being able to spin-up on-demand linear channels.

One of the key aspects of broadcast Playout is the need for assuring service uptime guarantees for playing out channels. Moving Playout to the cloud would need similar assurance in the Playout process as on-premises implementations.

Playout software disruptions lead to blackout on channels across downstream platforms through which consumer's access content. This can lead to consumer dissatisfaction, liabilities from operators and brand dilution for the TV networks and content owners.

In traditional Playout facilities, redundancy is accomplished by augmenting primary Playout with a secondary Playout capability. The Secondary Playout can either be on the same geographic site or in a different location to handle disaster recovery scenarios. As the Playout is moved to the cloud, redundancy of the Playout has been replicated by running another instance of the Playout as secondary, either at the same cloud data center or in a different data center. Said approach replicates the physical model of redundancy on the cloud. Thus, leads to an operating cost of the Playout being double of a non-redundant Playout, from an operating cost standpoint.

A typical Playout of a linear channel is controlled by a playlist which specifies a time-ordered set of content assets (video, audio, subtitle, graphics, logo, triggers) to be assembled and played out, at specific points of time.

Current cloud Playout implementations mimic the on-premises implementations in their design. This limits the benefits of the dynamism that cloud infrastructures provide.

Cloud implementations allow for servers to be dynamically instantiated, operated and relinquished. They enable effective disassociation of the computer, storage, and network, which enables dramatic performance and cost-optimized architectures evolve. This invention leverages multiple cloud infrastructure benefits to create broadcast-grade linear channels using Playout software.

FIELD OF THE INVENTION

This invention is related to utilizing cloud networks to improve TV and content network Playout.

SUMMARY OF THE INVENTION

When Playout software is instantiated on a cloud server and activated, it plays out the channel as per the time of day specified in the playlist, which controls the Playout. When this server crashes, the channel goes blank for that time instance, and thus breaks the complete linear channel. To avoid this, the traditional approach has been to run an additional secondary Playout system that replicates the primary system, which guarantees that at every point of time, either one of them is active or hence the linear channel never goes blank.

In one embodiment of this invention introduces a concept of 'time-advanced Playout' solves the redundancy problem. In this method, the Playout software generates the linear channel for a time-of-day ahead of the current broadcast time of the channel. This output from the Playout is fed to a delay buffer system, which delays the linear channel output. The delay in the buffer system is equal to the time-advancement that was effected in the Playout.

In a scenario where the 'time-advanced Playout' system crashes, the linear channel output is sustained through the delay buffers for pre-determined time duration. A redundancy control module which when detects the crash of the Playout system, instantiates a server to run a 'secondary Playout.

This secondary Playout is instructed to play from the exact next video frame where the primary Playout output stops, and its output is inserted into the delay buffer. The unique property of the secondary Playout is its ability to run 'faster than real-time' to fill the delay buffers with audio-video output, to compensate for the period that has elapsed from the time from which the primary Playout was down, and the secondary Playout starts sending its output into the delay buffers. Once this 'fast Playout' is accomplished to fill the delay buffer for this time compensation, a real-time rate Playout instance can start feeding the delay buffer, and takes the role as the primary Playout.

By using advancement of time in playing out linear feeds, with the delay buffers for the channel output, this invention can maintain frame-accurate linear channel output even during a Playout software crash. This has been accomplished without the need of running a complete parallel Playout system, which doubles the cost of operation. This method is very cost efficient and yet delivers the same levels of service guarantees of a completely replicated Playout system.

Creating Cost-Effective Playout

In a typical cloud Playout implementation, the server to run Playout software is instantiated and maintained until the end of life of the Playout or till the software crashes. In these implementations, the cost of the Playout is fixed and does not change over the lifetime of the Playout of the channel. Cloud infrastructure provides a mechanism to bid for server time on a continuous basis. This is because there is a server time marketplace determined by the demand-supply needs across time and regions.

In one embodiment of this invention, the system can leverage a bidding system for server-time to accomplish much lower prices of Playout over its lifetime. By using the concept of 'time-advanced Playout', the Playout software generates the linear channel for a time-of-day ahead of the channel's current broadcast time. This output from the 'primary Playout' is fed to a delay buffer system, which delays the linear channel output. The delay in the buffer system is equal to the time-advancement that was effected in the Playout.

A bidding engine is continually checking for lower-cost server instance availability. On the availability of a lower cost server instance, the server is instantiated with the Playout software (called the 'secondary Playout'). Once the software is up and running and starting to feed the stream into a delay buffer, the 'primary Playout' server is brought down. The output stream is not impacted as it is streamed out from the delay buffers and the input to the delay buffers switch from the 'primary Playout to the 'secondary Playout'.

Once the 'secondary Playout' system has taken over and the original 'primary Playout' cease to exist, the current 'secondary Playout' becomes the 'primary Playout'. The bidding process continues, and switching is accomplished across servers, which provides continual lower costs for Playout over its lifetime.

By introducing 'time-advanced Playout' and leveraging cloud infrastructure benefits of dynamic server instantiation, cost dynamics, storage-compute disassociation and ability to map Playout to different server-class machines to accomplish 'fast Playout', this invention opens a new dimension regarding performance and cost dynamics for cloud Playout.

In this invention, we disclose a redundant, cost-effective system for time-advanced, server-independent cloud Playout having a Playout sub-system (PLYM), a Cloud Store accessible over a network interface, a Delay Buffer Manager (DBM) module, and (d) a Playout Orchestration Manager (PORCH) module. The Playout sub-system (PLYM) having an Automation module, a Playout module, which assembles and blends one or more assets specified in a playlist including digital audio, video, graphics, subtitles and triggers, which is then sent to an encoder. The PLYM being executed on one or more servers based on the controls fed from an Automation module reads assets that need to be assembled which are typically in a Cloud Store, plays out the content by blending audio, video and graphics, and outputs an encoded stream using an encoder module to a target destination. The encoder could be a plurality of different standard formats either in compressed or uncompressed form. Typical encoders envisioned are to compress assembled streams into H.264, MPEG-2 or SMPTE-2022 formats. The Cloud Store is accessible independent of the status of the servers on which the PLYM is executed. The DBM is an intelligent delay buffer management module that takes streams from multiple instances of PLYMs and other Playout sources, delays the streams by storing them for a defined period of time, and then sends out a timed single output stream by picking data from different buffers thereby maintaining continuity of the output stream. The Playout Orchestration Manager (PORCH) module controls the PLYM and DBM, guaranteeing Playout output to be time-exact as specified in the playlist by instructing the PLYM to Playout ahead of schedule (time-advanced). The encoded output stream of the PLYM is stored in the DBM, which stores it for the exact duration of the time-advancement done in the PLYM, after which it is instructed by the PORCH to output the stream after a pre-determined delay. The PLYM, DBM, and PORCH are implemented as Containers, which helps in executing in different servers by binding them to a server instance dynamically.

We further disclose a redundant, cost-effective method for time-advanced, server-independent cloud Playout comprising the steps of, a Playout sub-system (PLYM), assembling and blending one or more assets specified in a playlist including digital audio and video that is then sent to an encoder, where the PLYM has an Automation module, and the PLYM is executed on one or more servers based on the controls fed from the Automation module, reading assets that need to be assembled that are typically in a Cloud Store, and playing out the content by blending audio, video and graphics, and outputs an encoded stream using an encoder module to a target destination. A Cloud Store accessible over a network interface independent of the status of the servers on which the PLYM is executed.

A DBM, which is an intelligent delay buffer management module taking streams from multiple instances of PLYMs and other Playout sources, delaying the streams by storing them for a defined period of time, and sending out a timed single output stream by picking data from different buffers thereby maintaining continuity of the output stream. A Playout Orchestration Manager (PORCH) module, controlling the PLYM and DBM, guaranteeing Playout output to be time-exact as specified in the playlist by instructing the PLYM to Playout ahead of schedule (time-advanced), storing the encoded output stream of the PLYM in the DBM, which stores it for exact duration of the time-advancement done in PLYM.

DETAILED DESCRIPTION OF THE PREFERRED EMBODIMENTS

Figure 1:
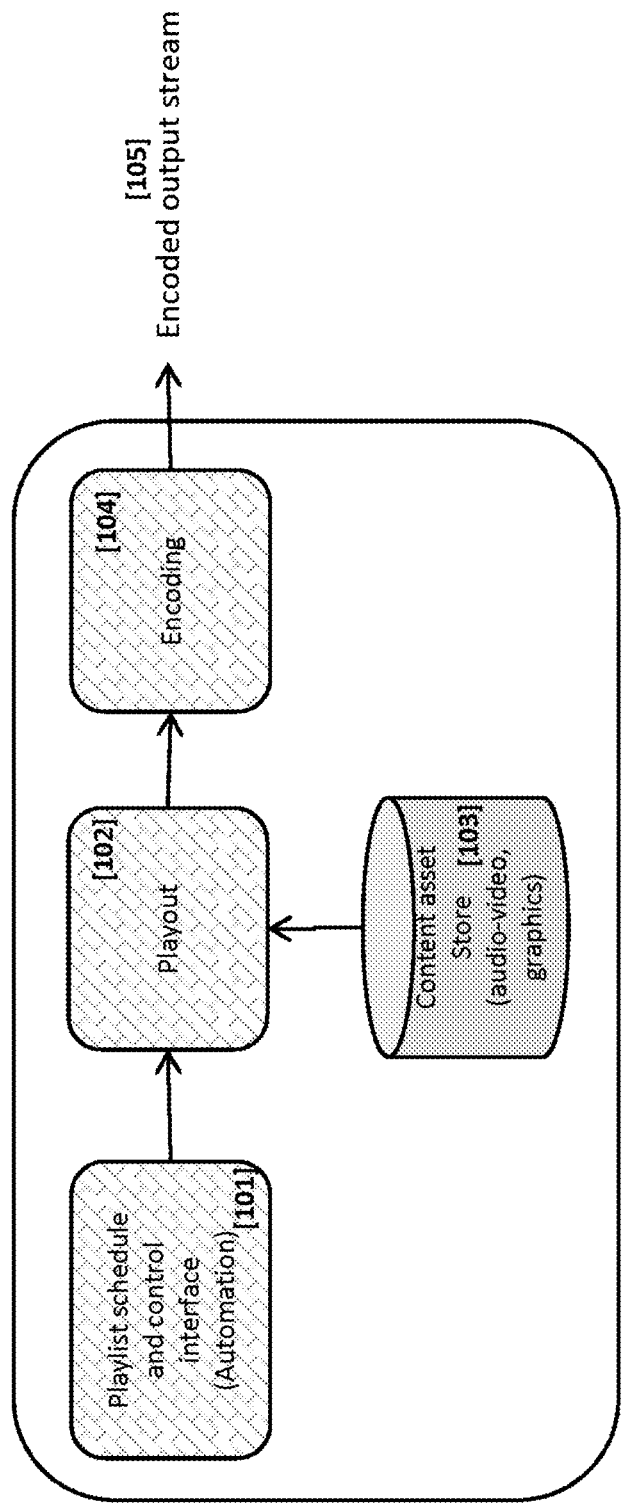
FIG. 1 illustrates a typical Playout system diagram.

FIG. 1 describes a typical linear channel Playout system with all its modules. There are playlist schedule and control system called Automation module 101, which takes in the linear assembly intent as a playlist instruction set. Typical playlist instruction set has a time-ordered list of audio, video and graphics elements that need to be assembled in the given time-order as part of the final linear feed. Typical playlists are created ahead of the time of assembly and Playout, although most automation systems provide controls for modifying or changing playlists as the process of Playout is underway.

This process of assembling the assets specified in the playlist and playing out the content by blending audio, video and graphics is accomplished by a Playout module 102. The Playout in addition to acting on the playlist also takes dynamic assembly or dis-assembly of assets based on the controls fed from the Automation 101 module. Assets that need to be assembled are typically in a Content Store 103 which is accessible to the Playout module 102. The Content Store 103 could either be local storage connected to the Playout server or storage accessible over a network.

In on-premise implementations, the Playout gives out uncompressed digital audio, a video stream that is then passed downstream. In cloud implementations, due to the need to transport the video stream out of the cloud, the stream is encoded using an encoder module 104 and sent out to the target destination as an encoded stream 105.

Figure 2:
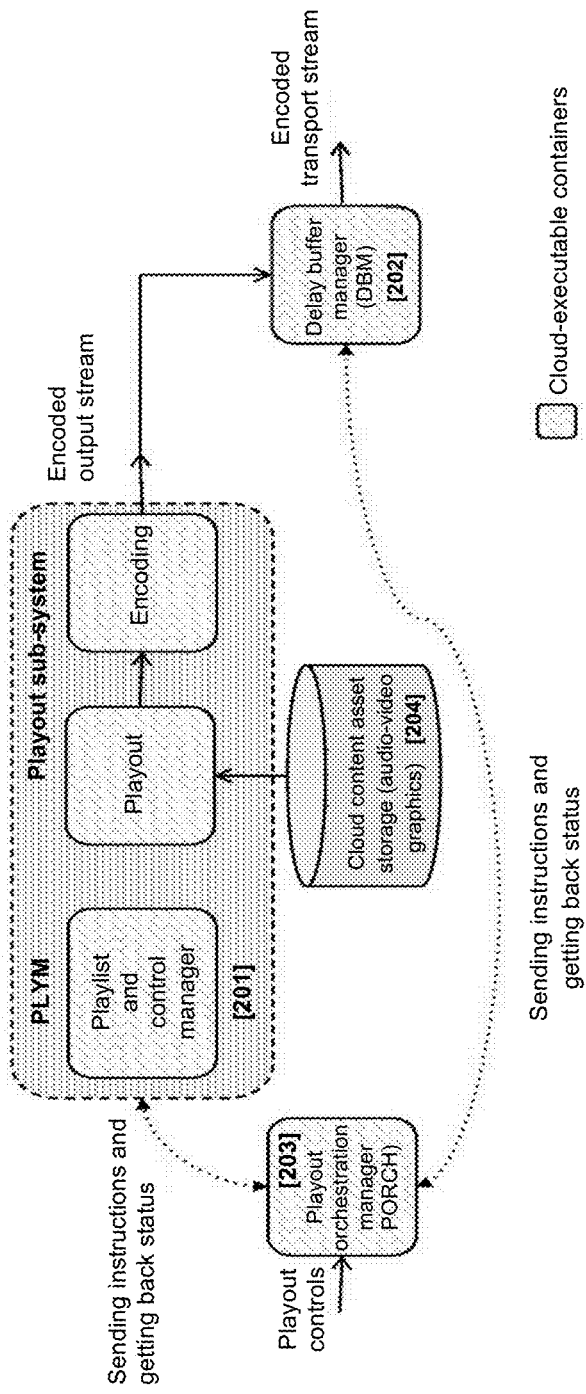
FIG. 2 illustrates server independent cloud Playout modules.

FIG. 2 describes the proposed server-independent cloud Playout system. In this system, there are two modules in addition to the Playout sub-system (PLYM) 201 described in FIG. 1. For making the Playout flexible, the content asset store is a Cloud Store 204 that is accessible over a network interface. It is assumed that Cloud Store 204 is accessible independent of the status of the servers on which the PLYM is executed. An output of the encoded stream from the Playout sub-system 201 is sent to a Delay Buffer Manager (DBM) 202. The DBM 202 is an intelligent delay buffer management module that takes streams from multiple sources, delays the streams by storing them for a defined period of time, and then sends out a timed single output stream by picking data from the different buffers to maintain continuity of the output stream.

Both the PLYM 201 and DBM 202 are controlled and monitored by a Playout Orchestration Manager (PORCH) 203 module. The PORCH 203 has the system knowledge of Playout time. The PORCH 203 instructs the PLYM 201 to Playout ahead of schedule (time-advanced) and instructs the DBM 202 to output stream after a pre-determined delay. By doing this, the PORCH 203 guarantees that the Playout output is time-exact to the intent specified in the playlist, although the PLYM is instructed to do a 'time-advanced Playout'. An output of the PLYM 201 is stored in the DBM 202, which stores it for the exact duration of the time-advancement done in the PLYM, post that it is instructed by the PORCH 203 to output the stream, thus accomplishing time-exact Playout as per the playlist intent.

The key part of this invention is the introduction of time-advanced Playout followed by the DBM delay buffers. All of these modules are implemented as Containers, which helps in executing in different servers by binding them to the server instance on a dynamic basis.

Figure 3:
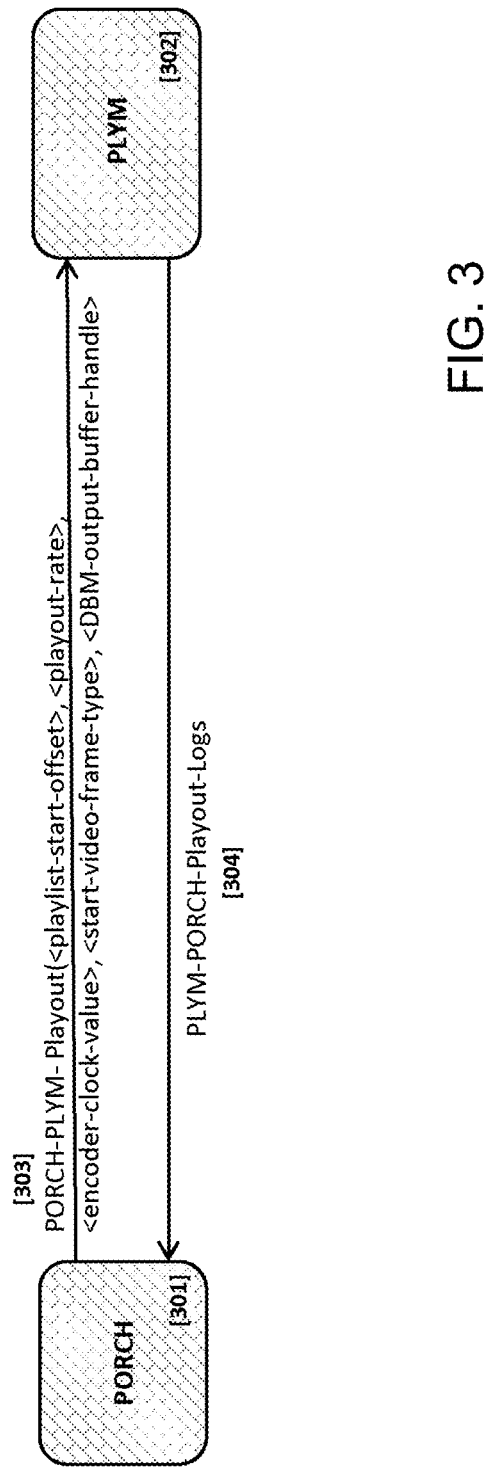
FIG. 3 illustrates a PORCH-PLYM communication.

FIG. 3 describes the salient communication that happens between the PORCH 301 and the PLYM 302 sub-system. To initiate the start of Playout, the PORCH 301 sends the instruction PORCH-PLYM-Playout 303 with the following key parameters.

<playlist-start-offset> specifies the PLYM from where in the Playlist it is expected to Playout from. This helps in scenarios when one PLYM is replaced with another, where the second instance can be instructed to start Playout exactly at the location where the first instance of PLYM stopped.

<playout-rate> specifies the rate at which the Playout is to be accomplished. The default rate of Playout is the rate at which video frames are consumed at the reception. This is 'normal rate'. For accomplishing multiple scenarios using this invention that are described below, it is anticipated that Playout should be able to provide assembled and encoded streams at multiples of the rate of consumption during the reception. For the use of some of the scenarios below, 'fast rate' is defined as a mode where the rate of Playout is faster than the rate of consumption at the reception. The rate of Playout is determined to be a multiple of the rate of consumption and is based on the latencies for instantiating cloud servers, and binding the PLYM to those servers, and get them ready for execution.

<encoder-clock-value> is the value of the encoder clock for the first encoded video that is sent out of PLYM. This is needed enable continuity of streams across multiple PLYM instances. In scenarios when one PLYM instance is replaced with another PLYM instance, then the encoder can be made to exactly continue the clock from where the first instance of PLYM had stopped.

<start-video-frame-type> is either of I or B or P frame type, in case of a compressed encoded stream, assigned to the first video frame to be encoded out of the Playout. This is needed to enable continuity of streams across multiple PLYM instances. In scenarios when one PLYM instance is replaced with another PLYM instance, then the encoder can be made to exactly continue from the subsequent video-frame-type from the stop point of the first instance of PLYM.

<DBM-output-buffer-handle> is the destination buffer onto which the Playout is expected to provide the output. In one possible implementation, DBM module is expected to have multiple buffer lists, which are numbered in a sequence. PORCH decides on the sequence number of the buffer handle to be provided to a PLYM instance. Each of the PLYM instances starts filling these buffers with the assembled and encoded data with its associated Playout time. DBM then plays out the timed data from the highest sequence numbered buffer in which data for that time instance is available.

Once all of these data is received by PLYM, it starts assembly of the audio, video, graphics, subtitle and trigger data as per the Playlist defined timeline and then encodes the data, and places them on the DBM-output-buffer-handle provided.

On completion of every video frame worth of encoding and buffering, it sends a status to PORCH in the form of PLYM-PORCH-Playout-Logs 303, which has the exact details of all the input parameters for the currently completed video frame.

Figure 4:
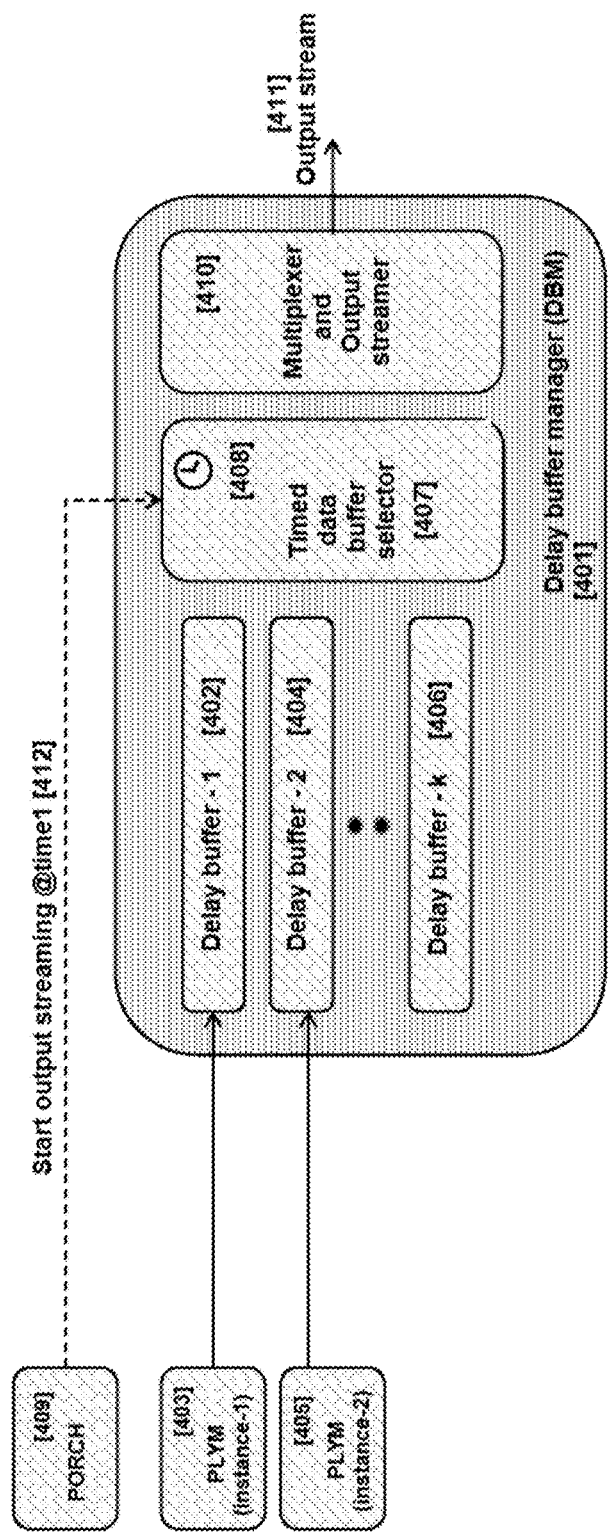
FIG. 4 illustrates one possible DBM implementation.

One possible DBM implementation described above is detailed in FIG. 4. DBM 401 comprises of key components comprising of delay buffers. In this Figure, delay buffer_1 402 is filled with encoded video streams from PLYM_Instance_1 403. If PORCH 409 had instantiated a second PLYM, then there would be PLYM_Instance_2 405, and its Playout output sent to delay buffer_2 404. The PORCH could instruct multiple different PLYM instances to output their input to different delay buffers and is represented in this Figure till delay buffer_k 406.

In this implementation, there exists a Timed data buffer selector 407, which chooses the delay buffer from which the encoded data is to be accessed for output. The Timed data buffer selector 407 is triggered to action by the PORCH by giving it the time of day from when it should start the output streaming, provided as an instruction 'start output streaming @time1 412. 'time1' as communicated by the PORCH 409 is 'time of Playout' as per Playlist. To adequately fill the delay buffers it is assumed that the PORCH 409 has instructed at the least one PLYM instance to Playout ahead of 'time1', where the duration of time-advancement is more than the need to switch PLYMs in different scenarios and yet maintain the output stream in a time-continuous fashion.

On receiving the instruction 412, the Timed data buffer selector 407 starts its own clock 408, which acts as the reference timer for an output streamer.

Based on the output stream periodicity needs as dictated by the clock 408, the Timed data buffer selector 407, finds the highest sequence numbered delay buffer with the needed timed data. In specific implementation scenarios, it is anticipated that the data for the same time shall be available from the multiple different PLYM instances in their mapped delay buffers. This implementation assumes an inherent policy aligned with the PORCH implementation that guides the selection of the right PLYM output, by providing the to be selected PLYM output to be sent to the highest sequence numbered delay buffer. This data is then transferred to the Multiplexer and output streamer module 410, which then sends out the Output stream.

Figure 5:
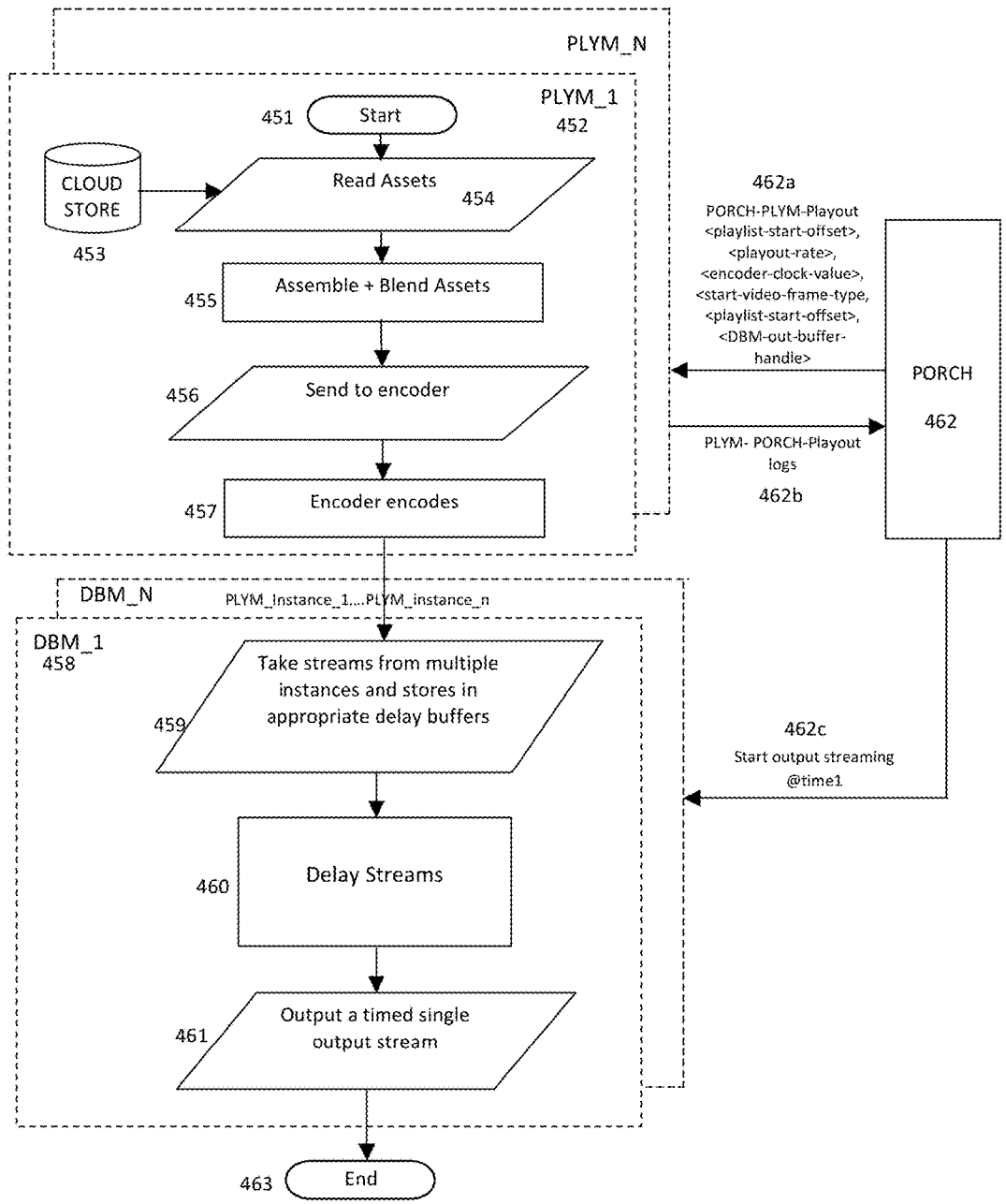
FIG. 5 illustrates the overall process.

FIG. 5 shows a redundant, cost-effective method for time-advanced, server-independent cloud Playout. The process starts 451, a Playout sub-system (PLYM) 201, assembling and blending one or more assets 455 specified in a playlist including digital audio and video that is then sent to an encoder 456, where the PLYM 452 has an Automation module and the PLYM is executed on one or more servers based on the controls fed from the Automation module, reading assets 454 that need to be assembled that are typically in a Cloud Store 453, and playing out the content by blending audio, video and graphics, and outputs an encoded stream using an encoder module 457 to a target destination. A Cloud Store 453 accessible over a network interface independent of the status of the servers on which PLYM 452 is executed. A DBM 458, which is an intelligent delay buffer management module. Taking streams from multiple instances of PLYMs and other Playout sources 459. Delaying the streams 460 by storing them for a defined period of time 459a. Sending out a timed single output stream 461 by picking data from the different buffers thereby maintaining continuity of the output stream. A Playout Orchestration Manager (PORCH) 462 module, controlling the PLYM and DBM, guaranteeing Playout output to be time-exact as specified in the playlist by instructing the PLYM to Playout ahead of schedule (time-advanced), storing the encoded output stream of the PLYM in the DBM 458 which stores it for exact duration of the time-advancement done in PLYM and the process ends 463.

Figure 6:
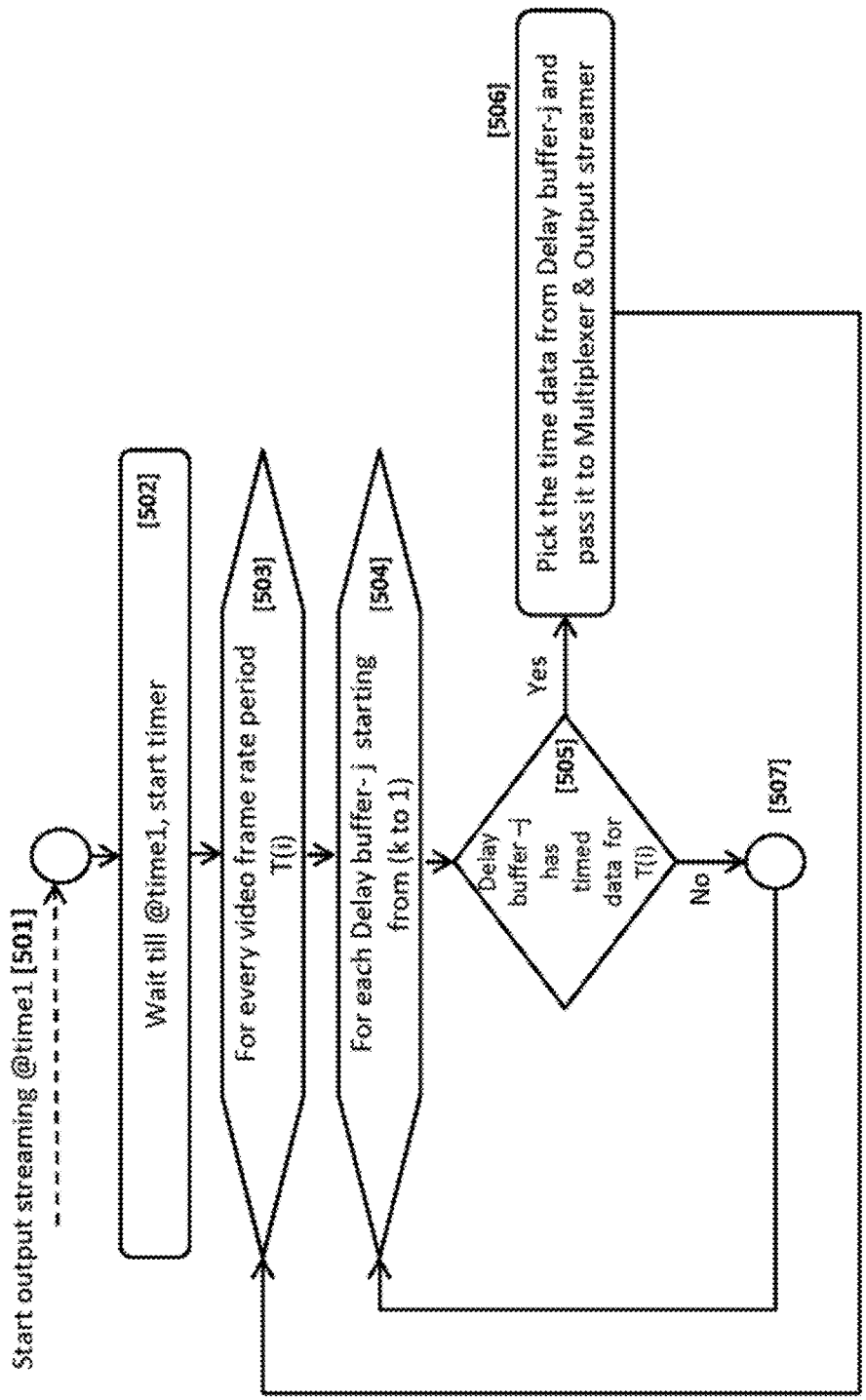
FIG. 6 illustrates timed data buffer selector method.

FIG. 6, expands the method for the Timed data buffer selector module. On receiving the 'Start output streaming @time1' message 501, the module waits till time of day clock is time1. At time1, starts the timer 502 and then starts an iterator for each of the video frame rate period 503. For each frame rate period T(i), another iterator to go over all the delay buffer is started 504, by going from the largest to the smallest delay buffer count. The implementation assumes an inherent policy aligned with the PORCH implementation that guides the selection of the right PLYM output, by providing the to be selected PLYM output to be sent to the highest sequence numbered delay buffer. If the timed data is found on the jth delay buffer, then that is selected and passed onto Multiplexer and output streamer module 506, else iterate through to a lower sequence numbered delay buffer 507.

The above-illustrated system and method with one possible implementation of a Delay Buffer Manager (DBM) implementation enable multiple cloud Playout scenarios to be accomplished in performance and cost-optimized manner.

One embodiment of the system is used to effect redundancy of Playout to provide a high uptime guarantee for Playout. In typical implementations, two instances of the Playout described in FIG. 1 are executed in parallel. The output from both the Playout is then either fed to switch or manually switched at the receiver-end.

Figure 7:
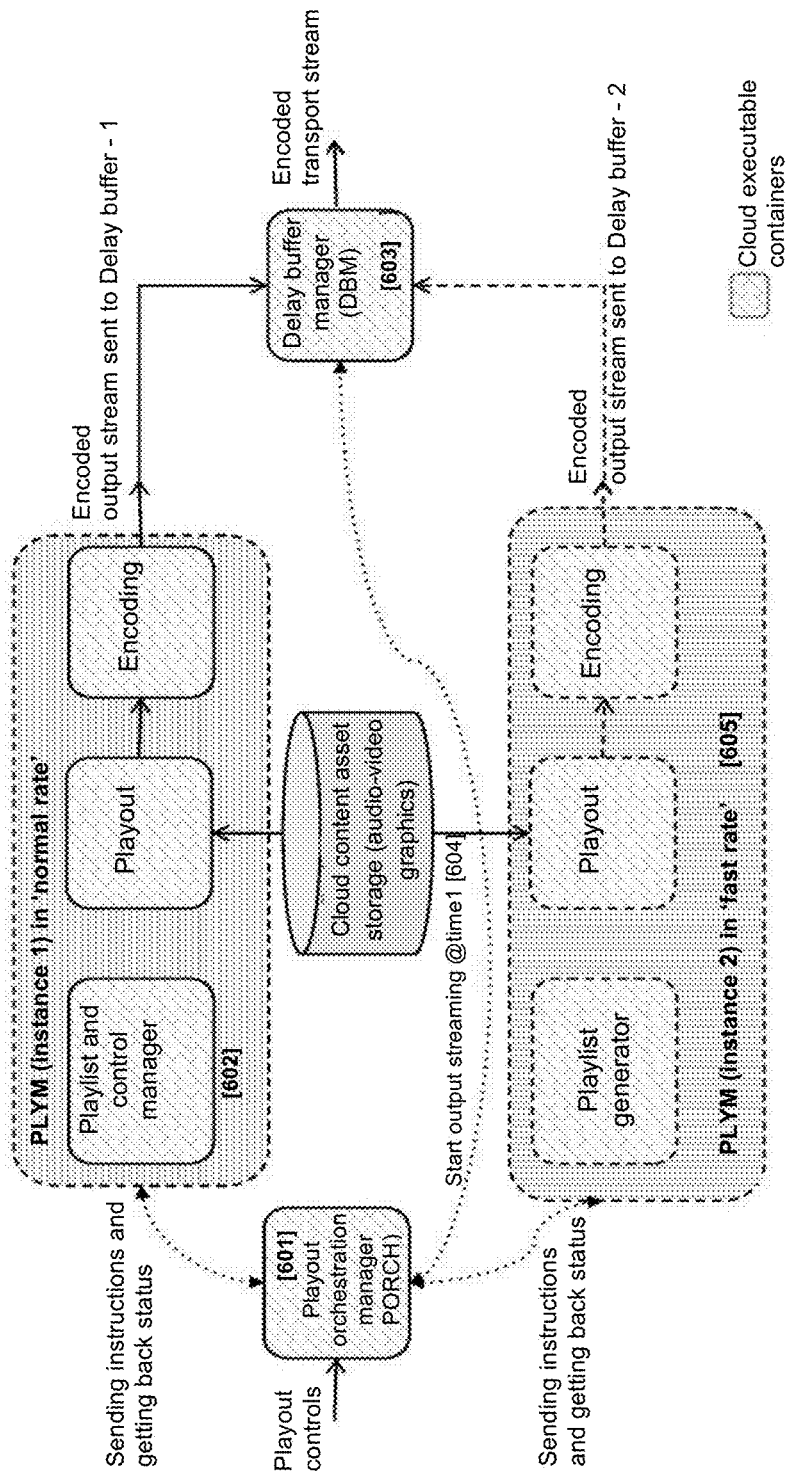
FIG. 7 illustrates Redundancy implementation.

In this system, Playout redundancy is accomplished as described in FIG. 7. At the start of Playout, the PORCH 601 initiates instantiation of PLYM_Instance_1 in 'normal rate' 602. PLYM_Instance_1 602 is instructed to start assembly and encoding process ahead of Playlist determined time. The output is then fed to delay buffer_1 of the Delay Buffer-Manager 603.

The PORCH 601 sends an instruction to start output streaming from DBM @time1, the start Playout time specified in the Playlist 604. This starts the primary Playout process going. In one possible implementation PORCH monitors the logs coming out of PLYM_Instance_1 to check for failures. There could be a plurality of implementations to monitor PORCH. The proposed monitoring through logs is one specific implementation option. The failures could be any of a) crash of Playout software, b) server hardware going down, c) network access lost, or d) cloud infrastructure region or availability zone crash.

When the PORCH detects a failure on the primary Playout, PLYM_Instance_1 602, then it instantiates secondary Playout, PLYM_Instance_2 605 in 'fast rate' with input parameters for Playout to match the continuity of the final output stream. This secondary PLYM output is sent to delay buffer_2 of DBM 603.

Given PLYM_Instance_2 is running at 'fast rate', which is N times faster than the normal Playout rate, delay buffer_2 starts to fill with data starting from the point of the crash of PLYM_Instance_1, but at N times the rate. N is the Playout rate multiple which is greater than 1, and is determined based on the latencies expected in bringing up PLYM on a new server instance. This ensures that before DBM's Timed data buffer selector exhausts delay buffer_1, PLYM_Instance_2 has started sending its output to delay buffer_2. 'fast rate' ensures buffer depletion due to the crash of PLYM_Instance_1 is time compensated.

Once secondary Playout is initiated, based on the failure root-cause, PORCH re-instantiates PLYM_Instance_1 in 'normal mode' either on a different server and or region or availability zone, with a future time determined Playlist time offset and encoder clock value and video frame type. Once PLYM_Instance_1 is up and running, and starts to feed the delay buffer_1, the PORCH brings down the secondary Playout PLYM_Instance_2.

DBM's Timed data buffer selector exhausts the delay buffer 2, by which time PLYM_Instance_1 is back as the primary Playout and starting to send its output to delay buffer_1. There will be instances of time, by design by the PORCH where delay buffer_1 and delay buffer_2 shall have the same timed data as part of the overlap sequence in bringing back the primary Playout. Timed data buffer in DBM as per its method specified in FIG. 6, exhausts all of the timed data on delay buffer 2 and then starts draining timed data from delay buffer_1.

Figure 8:
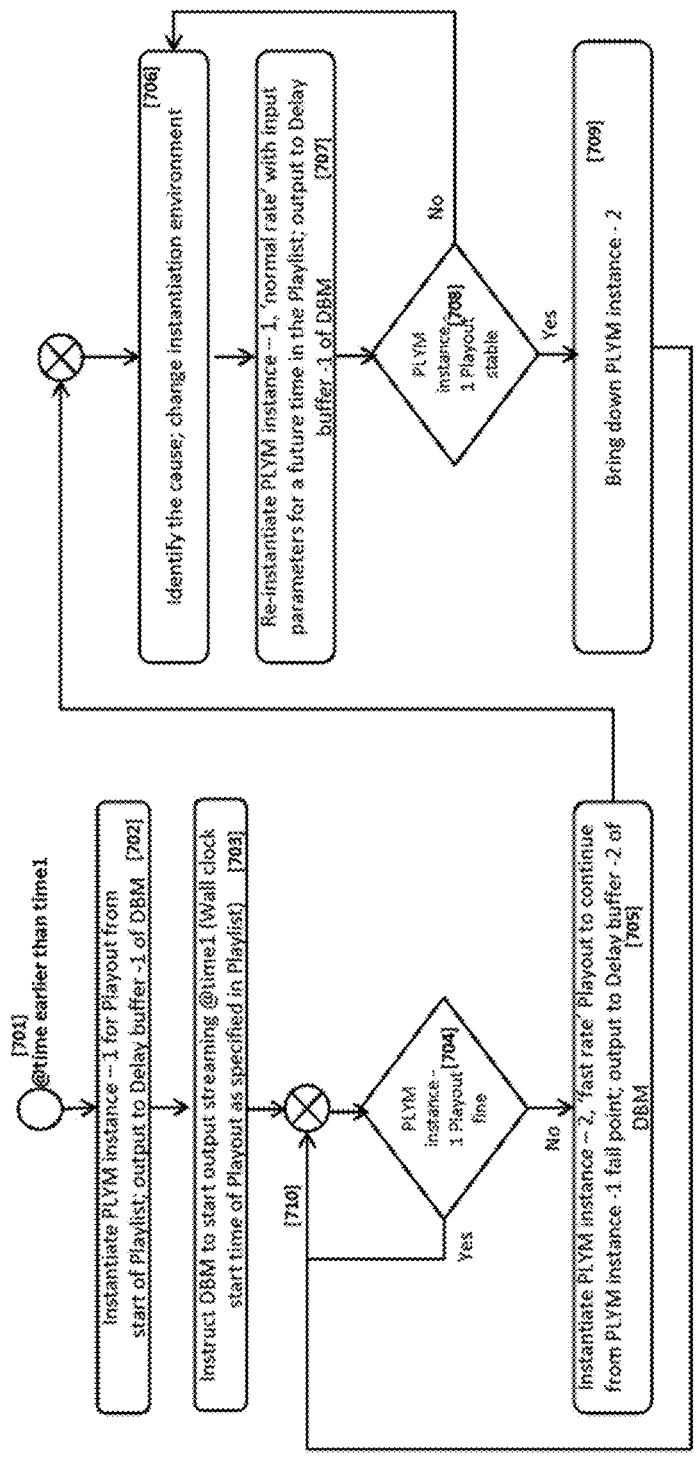
FIG. 8 illustrates PORCH redundancy method.

FIG. 8 expands the PORCH redundancy method for further illustration. At a time earlier than time1 701, the wall clock time at which Playout has to start as per Playlist, PLYM_Instance_1 is instantiated with the start of Playlist parameters and its output mapped to delay buffer_1 of DBM 702. This is the primary Playout for creating the linear feed. Time difference between time1 and time of start PLYM_Instance_1 Playout is calculated to exceed the time taken for instantiating PLYM_Instance_2 and getting the output of that Playout to reach delay buffer_2. This guarantees that during the time from start of a PLYM_Instance_1 crash to the time for output from PLYM_Instance_2 reaching delay buffer_2. The DBM output stream is maintained without any disruptions.

Once the PLYM_Instance_1 is up, instruct the DBM to start streaming output at time1 703. This is the wall clock time specified in the Playlist for start of Playout.

The DBM is expected to start streaming output which begins at this wall clock time.

The PORCH then starts monitoring PLYM_Instance_1 to see that the Playout occurs as planned 704. If there is no unplanned event, the PORCH continues to monitor. If a failure of PLYM_Instance_1 is identified, the PORCH instantiates PLYM_Instance_2 705. This is the secondary Playout instance. This is instantiated at a 'fast rate' so as assemble and encode at a pace which is twice the receiver consumption rate. This is to compensate for the time of the crash and for the time taken to bring up the secondary Playout. All input parameters are set so as enable the Playout to continue stream from the point of failure of PLYM_Instance_1.

Once PLYM_Instance_2 is up and running, the PORCH checks the reason for the failure of PLYM_Instance_1 706. This could happen for multiple reasons including but not limited to software crash, server breaks down, lose of network connectivity, region or zone data center down.

Based on the reason for failure a PLYM_Instance_1 is re-instantiated in a different environment, so as solve the cause of failure 707. The input parameters to start Playout are at a future point in time, which exceeds the total duration that has been spent in bringing up PLYM_Instance_2, and now PLYM_Instance_1. PLYM_Instance_1 on starting of Playout takes over as the primary Playout. The PORCH checks if the PLYM_Instance_1 is stable 708. If not, the process of identifying an alternate reason for failure starts again 707.

Once the PLYM_Instance_1 is stable, then secondary Playout of PLYM_Instance_2 is brought down 709, and the PORCH goes back to monitor PLYM_Instance_1 as the primary Playout option 704.

By using this sequence of PORCH instructions, PLYM instantiations, and delay buffer management, Playout output continuity was maintained even when the primary Playout instance had crashed. This has been realized on an on-demand basis, without the need for a fully redundant Playout running all the time in parallel to the primary Playout. Thus, saving the cost of an additional Playout server instance for the lifetime of the system.

Figure 9:
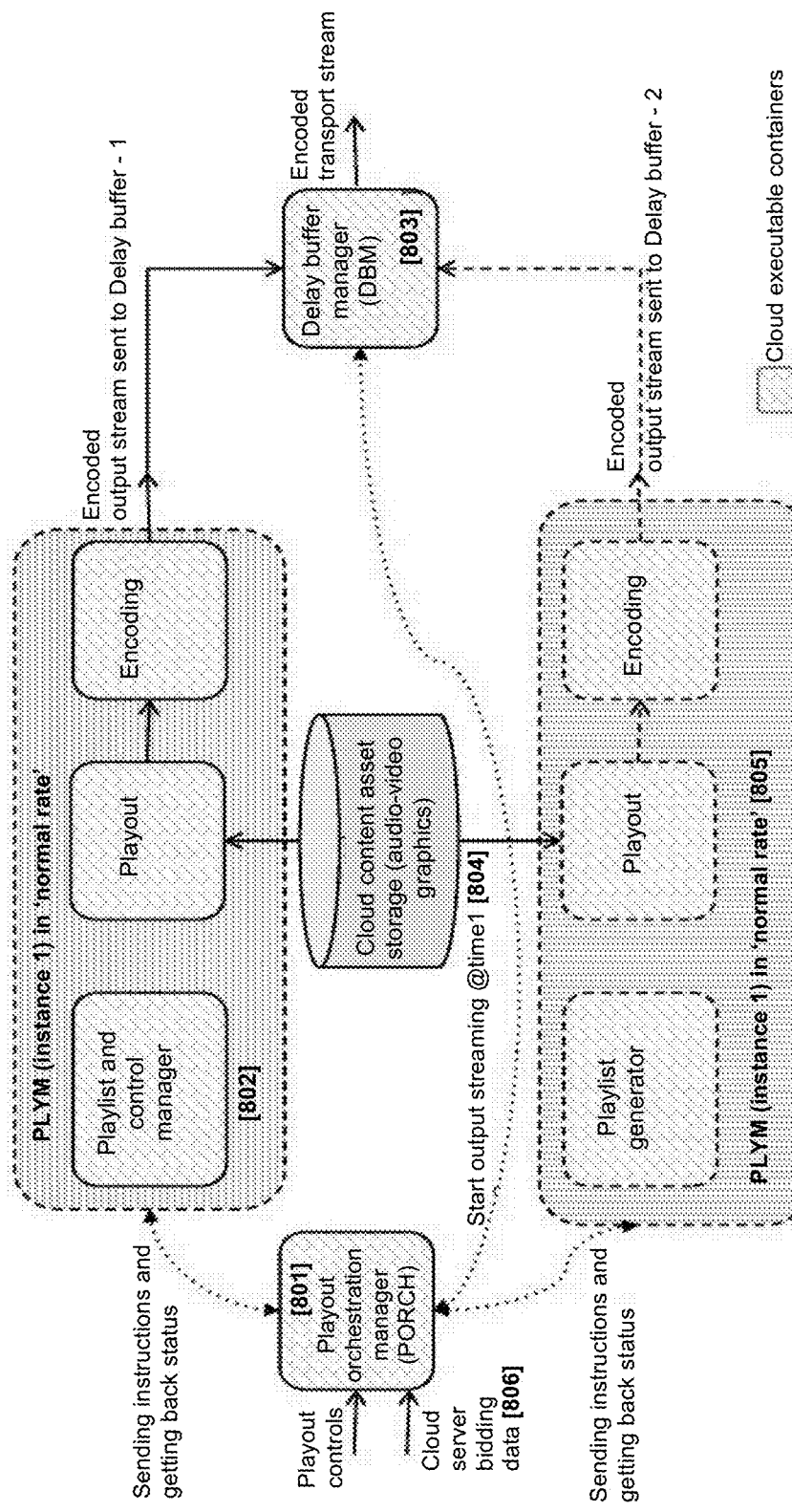
FIG. 9 illustrates cost-arbitrage implementation.

Another embodiment of the system is used to optimize the cost of Playout across its lifetime as described in FIG. 9, using the cost arbitrage available in renting cloud server time. Given the varying demand-supply of cloud server time, cloud infrastructure companies provide a bidding marketplace for server time pricing. In this embodiment, it is envisioned the presence of a bidding engine that continually looks for the lowest-cost Bid server available.

The PORCH 801, in addition to the Playout controls and other inputs, has information on the lowest bid price of available servers at every point in time 806.

When instantiating the first PLYM_Instance_1 as the primary Playout 802, it looks for the lowest-cost server and binds the PLYM_Instance_1 to that server. The PORCH then instructs Playout start to PLYM_Instance_1 and sends time1 (wall clock time for Playout start as determined by Playlist) at which time the DBM needs to start output stream 804.

To optimize the cost of Playout, the PORCH continually looks for the lower server price from the bidding data. If there is a Bid server available that is lower priced than the current server executing PLYM_Instance_1, then the PORCH activates a switch of servers to move the Playout to a lower priced server and shutting down the higher priced one. This is accomplished by starting PLYM_Instance_2 in parallel 805 to PLYM_Instance_1, and once PLYM_Instance_2 has started generating output onto delay buffer 2, then PLYM_Instance_1 is shutdown and PLYM_Instance_2 takes the place of PLYM_Instance_1, with the associated output delay buffer to DBM moved to delay buffer_1.

Figure 10:
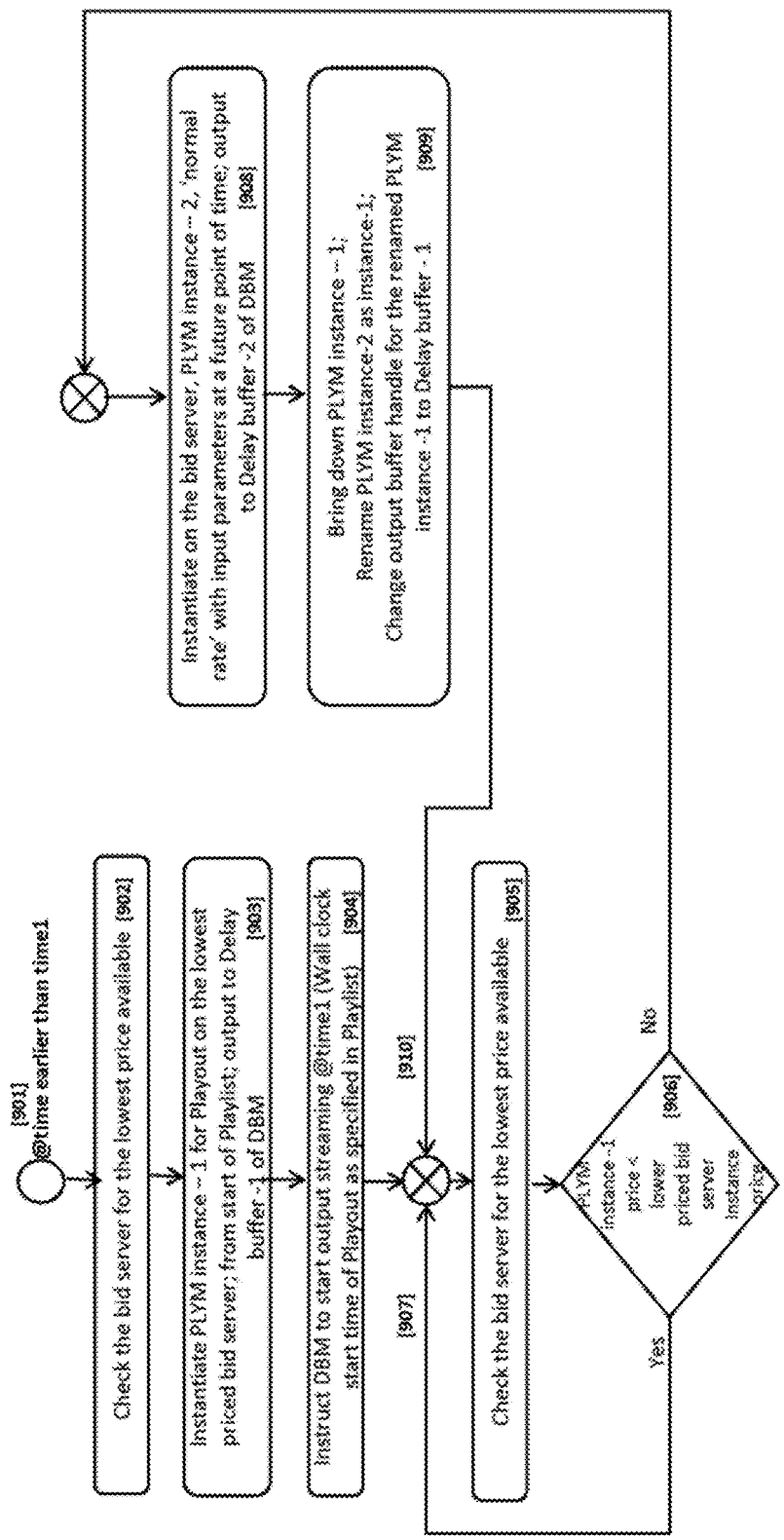
FIG. 10 illustrates PORCH cost-arbitrage method.

FIG. 10 expands the PORCH cost-arbitrage method that accomplishes this switch in further detail. At a time earlier than time1 901, the wall clock time at which Playout is to start as per Playlist, the Bid server is checked for availability of the lowest-priced server 902. PLYM_Instance_1 is instantiated on the lowest-priced server, with the start of Playlist parameters and its output mapped to delay buffer_1 of DBM 903. This is the primary Playout for creating the linear feed. Time difference between time1 and time of start PLYM_Instance_1 Playout is calculated to exceed the time taken for instantiating PLYM_Instance_2 and getting the output of that Playout to reach delay buffer_2. This guarantees that during the time of the switch from PLYM_Instance_1 to the time for output from PLYM_Instance_2 reaching delay buffer_2. DBM output stream is maintained without any disruptions.

Once the PLYM_Instance_1 is up, instructs the DBM to start streaming output at time1 904. This is the wall clock time specified in the Playlist for start of Playout. The DBM is expected to start streaming output starting at this wall clock time.

Periodically, the PORCH checks for the Bid server with the lowest price for the servers 905. It checks if the current played our server instance price is less than the new available lowest Bid server price 906. If yes, then it continues to monitor the Bid server for the lowest price and comparing the same with the current played out instance price 907. If there is a server instance with a lower price, then instantiate PLYM_Instance_2 on the newly Bid server 908. This Playout is done in 'normal rate', and the inputs are provided to start Playout at a future point in time. The specific time offset for playing out should exceed the maximum time taken for PLYM_Instance_2 to be instantiated, content assembled, encoded and received in delay buffer_2 of the DBM.

Once PLYM_Instance_2 is active, bring down PLYM_Instance_1 and rename PLYM_Instance_2 to PLYM_Instance_1 909. Also, change the output of the renamed PLYM_Instance_1 to point to delay buffer_1 on DBM. With this, an effective switch of servers for Playout has been accomplished without interruption of the final output stream from the DBM. The PORCH again starts to look for lower cost servers and the process continues 910.

The primary non-obvious invention of this system and method is the ability to start Playout of linear feeds ahead of their schedule; and then pass it onto a Delay Buffer Manager, from where the delayed feed is streamed as output at the scheduled wall clock time, as specified in the Playlist. By using a Playout Orchestration Manager to switch between Playout instances, one can render multiple different use-cases on Cloud Playout systems, without any disruptions in the played out output stream.

Two sample use-cases have been explained in this artifact, a) redundancy of Playout without the need to have a replicated Playout server in addition to the Primary and b) cost arbitrage in a cloud server-bidding marketplace by switching Playout to the lower cost server in a continual fashion. These are two of multiple different scenarios to leverage the invention, and those skilled in this art can come up with additional ones, which would come under the spirit of this invention.

The method for DBM and multiple different PORCH implementations are to be construed as one possible implementation to accomplish the needed use-cases and are no way limited to what this system and method represent.

No assumptions are made in terms of the hardware configurations, storage access model, geographic distance, network configurations or communication protocols between different modules described in this artifact. In fact, in some use-cases, there would be a need for some of the modules to be geographically distributed to accomplish specific objectives.

The invention claimed is:

1. A redundant, cost-effective system for time-advanced, server-independent cloud Playout having (a) a Playout sub-system (PLYM) 201, (b) a Cloud Store 204 accessible over a network interface, (c) a Delay Buffer Manager (DBM) module 202, and (d) a Playout Orchestration Manager (PORCH) 203 module, wherein:

the Playout sub-system (PLYM) 201 has an Automation module configured as a Playout, which assembles and blends one or more assets specified in a playlist, which playlist is then sent to an encoder, the PLYM being executed on one or more servers based on instructions fed from the Automation module, wherein the Automation module is configured to read assets to be assembled as stored in a Cloud Store 204, and configured to play out the content by blending audio, video and graphics, and configured to output an encoded stream using an encoder module to a target destination;

the Cloud Store 204 is accessible independent of the status of the servers on which the PLYM is executed;

the DBM 202 is an intelligent delay buffer management module configured to take streams from multiple instances of PLYMs, and configured to delay the streams by storing them for a defined period of time, and then configured to send out a timed single output stream by picking data from the different buffers thereby maintaining continuity of the output stream, the DBM 202 comprising one or more delay buffers 402-406, a Timed data buffer selector 407, a clock for the Timed data buffer selector 408, and a Multiplexer and output streamer module 410;

the Playout Orchestration Manager (PORCH) 203 module controls the PLYM 201 and DBM 202, guaranteeing Playout output to be time-exact, as specified in the playlist, by instructing the PLYM 201 to Playout ahead of schedule time-advanced;

the encoded output stream of the PLYM 201 is stored in the DBM 202, which stores the encoded output stream for exact duration of the time-advancement done in the PLYM 201, after which the DMB 202 is instructed by PORCH 203 to output the stream after a pre-determined delay; and the PLYM 201, DBM 202 and PORCH 203 are implemented as Containers, facilitating executing in different servers by binding them to a server instance dynamically;

wherein:

the delay buffers are filled with encoded video streams from one or more PLYM instances (403, 405) wherein the PORCH 409 instructs at least one PLYM instance to Playout ahead of a duration of time-advancement time_1 412, which is more than the need to switch between PLYMs while maintaining the output stream in a time-continuous fashion;

the Timed data buffer selector 407 chooses the delay buffer from which encoded data is to be accessed for output, and is triggered to action by the PORCH by giving the PORCH the time of day from when it should start the output streaming, provided as a start instruction, with a duration of time-advancement time_1 412, which is the time of the Playout in accordance with a playlist;

on receiving this instruction 412, the Timed data buffer selector 407 starts its own clock 408, which acts as a reference timer for the Multiplexer and output streamer module 410;

based on output stream periodicity needs, as dictated by the clock 408, the Timed data buffer selector 407 finds the highest sequence numbered delay buffer with the needed timed data, wherein a higher number indicates a greater priority, such that the PORCH implements a selection policy for the right PLYM output by providing the selected PLYM output to be sent to the highest sequence numbered delay buffer; and this data is then transferred to the Multiplexer and output streamer module 410, which then sends out the output stream.

2. The system of claim 1 wherein the PORCH 301 and PLYM 302 sub-system are configured to communicate such that:

to initiate the start of Playout, the PORCH 301 is configured to send an instruction PORCH-PLYM-Playout 303 with the following key parameters:

a playlist start offset, which specifies the point in the playlist where the PLYM 302 is expected to Playout from, to enable scenarios when one PLYM 302 is replaced with another, such that the second instance is configured to be instructed to start Playout exactly at the location where the first instance of PLYM 302 is stopped;

a Playout rate that specifies the rate at which the Playout is to be accomplished;

an encoder clock value, which is the value of the encoder clock for the first encoded video that is sent out of the PLYM, which is used to enable continuity of streams across multiple PLYM instances wherein scenarios when one PLYM instance is replaced with another PLYM instance, are handled by making the encoder continue the clock exactly from where the first instance of PLYM 302 had stopped;

a start video frame type, assigned to the first video frame to be encoded out of the Playout to enable continuity of streams across the multiple PLYM instances; and a DBM output buffer handle, which is a destination buffer onto which the Playout is expected to provide the output;

upon receiving these parameters, the PLYM is configured to assemble audio, video, graphics, subtitles, and trigger data according to a playlist defined timeline, and then is configured to encode the data and place the data in the provided DBM output buffer handle; and upon completion of every video frame worth of encoding and buffering, the PLYM 302 is configured to send a status to the PORCH 301 in the form of PLYM-PORCH-Playout-Logs 303, which has exact details of all input parameters for the currently completed video frame.

3. The system of claim 1 wherein the Timed data buffer selector 407 is configured to receive a 'Start output streaming @time1' message 501 such that:

when day clock is time1 the Timed data buffer selector 407 starts the timer 502 and then starts an iterator for each of the video frame rate period 503;

for each frame rate period T(i), the Timed data buffer selector 504 starts another iterator to go over all delay buffers, going from the largest to the smallest delay buffer count; and if the timed data is found on a jth delay buffer then that is selected and passed onto Multiplexer and output streamer module 506, if the timed data is not found on the jth delay buffer then the Timed data buffer selector iterates through to a lower sequence numbered delay buffer 507.

4. The system of claim 1 wherein Playout redundancy is achieved by:

the PORCH being configured to monitor one or more logs coming out of a primary PLYM_Instance_1, and being configured to execute the delay buffer at a 'normal rate' to check for failures;

the PORCH being configured to instantiate a second PLYM_Instance_2 605 when it detects a failure in primary Playout, PLYM_Instance_1 602, PLYM_Instance_2 being configured to execute the delay buffer at a 'fast rate' with input parameters for Playout that match the continuity of the final output stream wherein PLYM_Instance_2's output is sent to delay buffer_2 of the DBM 603;

as PLYM_Instance_2 is executing at a 'fast rate', the delay buffer_2 is configured to fill with data starting from the point at which PLYM_Instance_1 crashed but at a much quicker rate than the 'normal rate' of PLYM_Instance_1 thereby ensuring that before DBM's Timed data buffer selector exhausts delay buffer_1, PLYM_Instance_2 also is configured to start sending its output to delay buffer_2, by time-compensating to achieve buffer depletion;

once secondary Playout is initiated, based on the failure, the PORCH is configured to re-instantiate PLYM_Instance_1 in 'normal mode' either on a different server or region or availability zone, with a future time determined playlist time offset and encoder clock value and video frame type;

once the PLYM_instance_1 is up and running, and starting to feed the delay buffer_1, the PORCH is configured to being down the secondary Playout PLYM_Instance_2; and the DBM's Timed data buffer selector is configured to exhaust the delay buffer_2, by which time the PLYM_Instance_1 is back as the primary Playout and starts to send output to delay buffer_1.

5. The system of claim 4 wherein the PORCH ensures that the delay buffer_1 and delay buffer_2 have the same timed data as part of the overlap sequence in bringing back the primary Playout.

6. The system of claim 1 wherein the system is configured for cost-optimization of Playout across its lifetime, via a cost arbitrage available in renting cloud server time, such that:

the PORCH 801, in addition to the Playout controls and other inputs, is configured to maintain information on the lowest bid price of available servers at every point in time 806;

when instantiating the first PLYM_Instance_1 as the primary Playout 802, the PORCH 801 is configured to look for the lowest-cost server and binds the PLYM_Instance_1 to that server;

the PORCH 801 then is configured to Playout start to the PLYM_Instance_1 and is configured to send time1, which is the wall clock time for Playout start, as determined by playlist, at which time the DBM is configured to start output stream 804;

the PORCH 801 is configured to continually look for the lower server price from the bidding data to optimize costs such that if there is a bid server available that is lower priced than the current server executing Playout_Instance_1, then PORCH is configured to activate a switch of servers to move the Playout to a lower priced server, and shuts down the higher priced one; and the PORCH 801 is configured to accomplish the switch by starting PLYM_Instance_2 in parallel 805 to PLYM_Instance_1, and once PLYM_Instance_2 has started generating output onto the delay buffer_2, then PLYM_Instance_1 is shutdown and PLYM_Instance_2 takes the place of PLYM_Instance_1, with the associated output delay buffer to DBM moved to delay buffer_1.

7. A redundant, cost-effective method for time-advanced, server-independent cloud Playout comprising the steps of:

a Playout sub-system (PLYM) 454:
assembling and blending one or more assets 455 specified in a playlist including digital audio and video that is then sent to an encoder 456, where the PLYM 452 has an automation module and the PLYM is executed on one or more servers based on the controls fed from the Automation module;

reading assets 454 to be assembled that are typically in a Cloud Store 453; and playing out the content by blending audio, video and graphics, and outputting an encoded stream using an encoder module 457 to a target destination;

executing the PLYM 452 on servers and facilitating a communication between the servers and Cloud Store 453 such that Cloud Store 453 is accessible over a network interface but independent of the status of the servers on which the PLYM 452 is executed;

a Delay Buffer Management module (DBM) 458:
taking streams from multiple instances of PLYMs and other Playout sources 459;

delaying the streams 460 by storing the streams 460 for a defined period of time 459a; and sending out a timed single output stream 461 by picking data from different buffers thereby maintaining continuity of output stream;

filling one or more delay buffers 402-406 with encoded video streams from one or more PLYM instances (403, 405), wherein the PORCH 409 instructs at least one PLYM instance to Playout ahead
of a duration of time-advancement time1 412, which is more than is needed to switch between PLYMs while maintaining the output stream in a time-continuous fashion; and a Playout Orchestration Manager (PORCH) 462 module:
controlling the PLYM and DBM, guaranteeing Playout output to be time-exact as specified in the playlist by instructing the PLYM to Playout ahead of schedule and time-advanced; and storing the encoded output stream of the PLYM in the DBM, 458 which stores the encoded output stream for the exact duration of time-advancement done in the PLYM a Timed data buffer selector 407:
choosing the delay buffer from which the encoded data is to be accessed for output, and the PORCH triggering delay buffer to action by providing the time of day from when Timed data buffer selector 407 should start the output streaming, provided as a start instruction with the duration of time-advancement time1 412, which is the time of the Playout in accordance with a playlist;

on receiving the instruction 412, the Timed data buffer selector 407 starting a own clock 408, which acts as the reference timer for the Multiplexer and output streamer module 410; and based on the output stream periodicity needs, as dictated by the clock 408, the Timed data buffer selector 407, finding the highest sequence numbered delay buffer with the needed timed data, wherein a higher number indicates a greater priority such that the PORCH implements a selection policy for the right PLYM output by providing the selected PLYM output to be sent to the highest sequence numbered delay buffer; and transferring the highest sequence numbered delay buffer with the needed timed data to the Multiplexer and output streamer module 410, which then sends out output stream.

8. The method of claim 7, wherein the PORCH 462 and PLYM 452 sub-system are communicatively coupled, the method further comprising the steps of:
   the PORCH 462 initiating the start of Playout by sending an instruction PORCH-PLYM-Playout 462*a* with the following key parameters:
      a playlist start offset, which specifies the point in the playlist where the PLYM is expected to Playout from, to enable scenarios where one PLYM is replaced with another, such that the second instance is instructed to start Playout exactly at the location where the first instance of PLYM stopped;
      a Playout rate that specifies the rate at which the Playout is to be accomplished;
      an encoder clock value, which is the value of the encoder clock for the first encoded video that is sent out of the PLYM, which is used to enable continuity of streams across multiple PLYM instances, wherein scenarios where one PLYM instance is replaced with another PLYM instance are handled by making the encoder continue the clock exactly from where the first instance of the PLYM had stopped;
      a start video frame type, assigned to the first video frame to be encoded out of the Playout to enable continuity of streams across multiple PLYM instances; and
      a DBM output buffer handle, which is the destination buffer onto which the Playout is expected to provide the output; and
   the PLYM:
      assembling 455 audio, video, graphics, subtitles, and trigger data according to a playlist defined timeline, upon receiving the parameters associated with the PORCH-PLYM-Playout 462*a*;
      encoding 457 the data and placing the data in the provided DBM output buffer handle; and
      sending a status to the PORCH upon completion of every video frame, in the form of PLYM-PORCH-Playout-Logs 462*b*,
      which has the exact details of all input parameters for the currently completed video frame.

9. The method of claim 7 wherein the Timed data buffer selector 407 receives a 'Start output streaming @time1' message 501, the method further comprising the steps of:
   starting the timer 502 when day clock is time1 and then starting an iterator for each of the video frame rate period 503;
   starting another iterator 504 for each frame rate period T(i) to go over all the delay buffers, by going from the largest to the smallest delay buffer count; and
   upon finding timed data in a jth delay buffer, selecting that and passing it onto Multiplexer and output streamer module 506, else the Timed data buffer selector iterating through to a lower sequence numbered delay buffer 507.

10. The method of claim 7 further comprising the steps of:
   instantiating PLYM_Instance_1 at a time earlier than time1 701, which is the wall clock time at which Playout is to start as per the playlist, with the start of the playlist parameters mapping its output to delay buffer_1 of DBM 702, which is the primary Playout for creating the linear feed;
   calculating a Time difference between time1 and time of start PLYM_Instance_1 Playout so as to exceed the time taken for instantiating PLYM_Instance_2 and getting the output of that Playout to reach delay buffer_2, thereby guaranteeing that during the time from start of a PLYM_Instance_1 crash to the time for output from PLYM_Instance_2 reaching delay buffer_2 DBM output stream is maintained without any disruptions;
   instructing the DBM to start streaming output at time1 703 once the PLYM_Instance_1 is up, time1 being the wall clock time specified in the playlist for start of Playout;
   the PORCH continuously monitoring PLYM_Instance_1 to see that the Playout is happening as planned 704;
   the PORCH identifying a failure of PLYM_Instance_1 and instantiating PLYM_Instance_2 705, which is the secondary Playout instance at a 'fast rate' to compensate for the time of crash and for the time taken to bring up the secondary Playout;
   setting all input parameters to enable Playout to continue stream from the point of failure of PLYM_Instance_1;
   the PORCH checking the reason for the failure of PLYM_Instance_1 706 once PLYM_Instance_2 is up and running;
   re-instantiating PLYM_Instance_1 in a different environment, so as solve the cause of failure 707 wherein one or more input parameters to start Playout are at a future point in time, which exceeds total duration that has been spent in bringing up PLYM_Instance_2, and now PLYM_Instance_1;
   PLYM_Instance_1 starting of Playout taking over as the primary Playout;
   the PORCH checking if the PLYM_Instance_1 is stable 708 and if not, restarting the process of identifying an alternate reason for failure 707;
   the PORCH bringing down the secondary PLYM_Instance_2 709 once the PLYM_Instance_1 is stable and going back to monitoring PLYM_Instance_1 as the primary Playout option 704; and
   maintaining Playout output continuity even when the primary Playout instance had crashed and realizing the same on an on-demand basis without the need for a fully redundant Playout.

11. The method of claim 10 wherein the PORCH ensures delay buffer_1 and delay buffer_2 have the same timed data as part of the overlap sequence in bringing back the primary Playout.

12. The method of claim 7 for cost-optimization of Playout across a lifetime using the cost arbitrage available in renting cloud server time, the method comprising the steps of:
   checking a Bid server for availability of a lowest-priced server 902 at a time earlier than time1 901 which is the wall clock time at which the Playout is to start as per playlist;
   instantiating PLYM_Instance_1 on the lowest priced server with the start of playlist parameters and its output mapped to delay_buffer_1 of DBM 903 which is the primary Playout for creating the linear feed;
   calculating a time difference between time1 and time of start PLYM_Instance_1 Playout so as to exceed the time taken for instantiating PLYM_Instance_2 and getting the output of that Playout to reach delay buffer_2 thereby guaranteeing that during the time of switch from PLYM_Instance_1 to the time for output from PLYM_Instance_2 reaching delay buffer_2 the DBM output stream is maintained without any disruptions;

instructing the DBM to start streaming output at time1 904 once the PLYM_Instance_1 is up, time1 being the wall clock time specified in the playlist for start of Playout;

the PORCH periodically checking for the Bid server with the lowest price for the servers 905 by checking if the current played out server instance price is less than the new available lowest bid server price 906:

if less than the new available lowest bid server price 906, the PORCH continuing to monitor the Bid server for lowest price and comparing the same with the current played out instance price 907, wherein if there is a server instance with a lower price, then instantiating PLYM_Instance_2 on the new Bid server 908 at a 'normal rate' and providing the inputs to start Playout at a future point in time wherein the specific time offset for playing out should exceed the maximum time taken for PLYM_Instance_2 to be instantiated, content assembled, encoded and received in delay buffer_2 of the DBM;

bringing down PLYM_Instance_1 and renaming PLYM_Instance_2 to PLYM_Instance_1 909, once PLYM_Instance_2 is active;

changing the output of the renamed PLYM_Instance_1 to point to delay buffer_1 on DBM to effect switching the servers for Playout without interruption of the final output stream from DBM; and the PORCH iterating looking for lower cost servers 91.

* * * * *